Aug. 10, 1965 L. D. JOHNSON 3,200,206

CONTROL APPARATUS

Filed July 7, 1960 2 Sheets-Sheet 1

INVENTOR.
Lee D. Johnson
BY
Charles L. Sturtevant

Aug. 10, 1965 L. D. JOHNSON 3,200,206

CONTROL APPARATUS

Filed July 7, 1960 2 Sheets-Sheet 2

INVENTOR.

Lee D. Johnson

BY

Charles L. Sturtevant

Atty.

3,200,206

CONTROL APPARATUS

Lee D. Johnson, Kailua, Hawaii, assignor to Kentron Hawaii, Limited, Honolulu, Hawaii, a corporation of Hawaii Filed July 7, 1960, Ser. No. 41,408
3 Claims. (Cl. 179—100.1)

The present invention relates to new and useful improvements in a synchronizing or control apparatus, and more particularly to such improvements in an apparatus adapted for use in conjunction with some device, such as a slide projector, for automatic actuation thereof in a predetermined manner.

There are now available on the market, slide projectors which are capable of more or less semi-automatic operation. Such projectors incorporate a magazine of slides or a film strip, and remote actuation thereof, as by operation of a push button, effects step-by-step projection of the slides or of the picture frames on the film. Since the pictures can be set up in any desired order in a magazine, as for projection to accompany a lecture or the like, it is desirable that the projector be capable of automatic operation or switching in synchroism with a prerecorded tape and such a tape might have a lecture, or possibly music thereon. Efforts have been made heretofore to synchronize a slide projector with a recorded tape which have involved defacing of the tape, as by slitting thereof or as by securing foil thereon, thereby precluding the tape from being used in the future for any other purpose.

One of the principal objects of the present invention is to provide an apparatus for operating a device, such as a slide projector, in synchronism with another device, such as a tape recorder, and wherein the apparatus is operable with any of a plurality of standard tape recorders or slide projectors without modification of either the slide projector or the tape recorder.

Another object of the invention is to provide such an apparatus wherein the tape can be recorded on any recorder and can be played back on any other recorder as long as the recorders are capable of operation at the same speed.

A further object of the invention is to provide such an apparatus which is completely self-contained; which is relatively small and readily portable, and which is independent of external power sources.

A still further object of the invention is to provide a control apparatus for operating an automatic slide projector in synchronism with a tape recorder utilizing electronic circuitry representing a combination into a single circuit of principles of two separate circuits.

More specifically, with respect to the above, an object of the invention is to provide an electronic control device for use in conjunction with a tape recorder and an automatic slide projector, and having electronic means alternatively usable as a tuned oscillator or as a frequency selective amplifier, whereby to operate either for impressing a code tone on a tape or for operating a slide projector in response to a code tone already on a tape.

The invention still further aims to provide an apparatus substantially of the above type which is compact in its composite assembly; which lends itself to relative ease of manufacture; and which is reliable in its operation.

The above and of other objects of the invention will in part be obvious and will be hereinafter more fully pointed out.

Figures 1, 2:
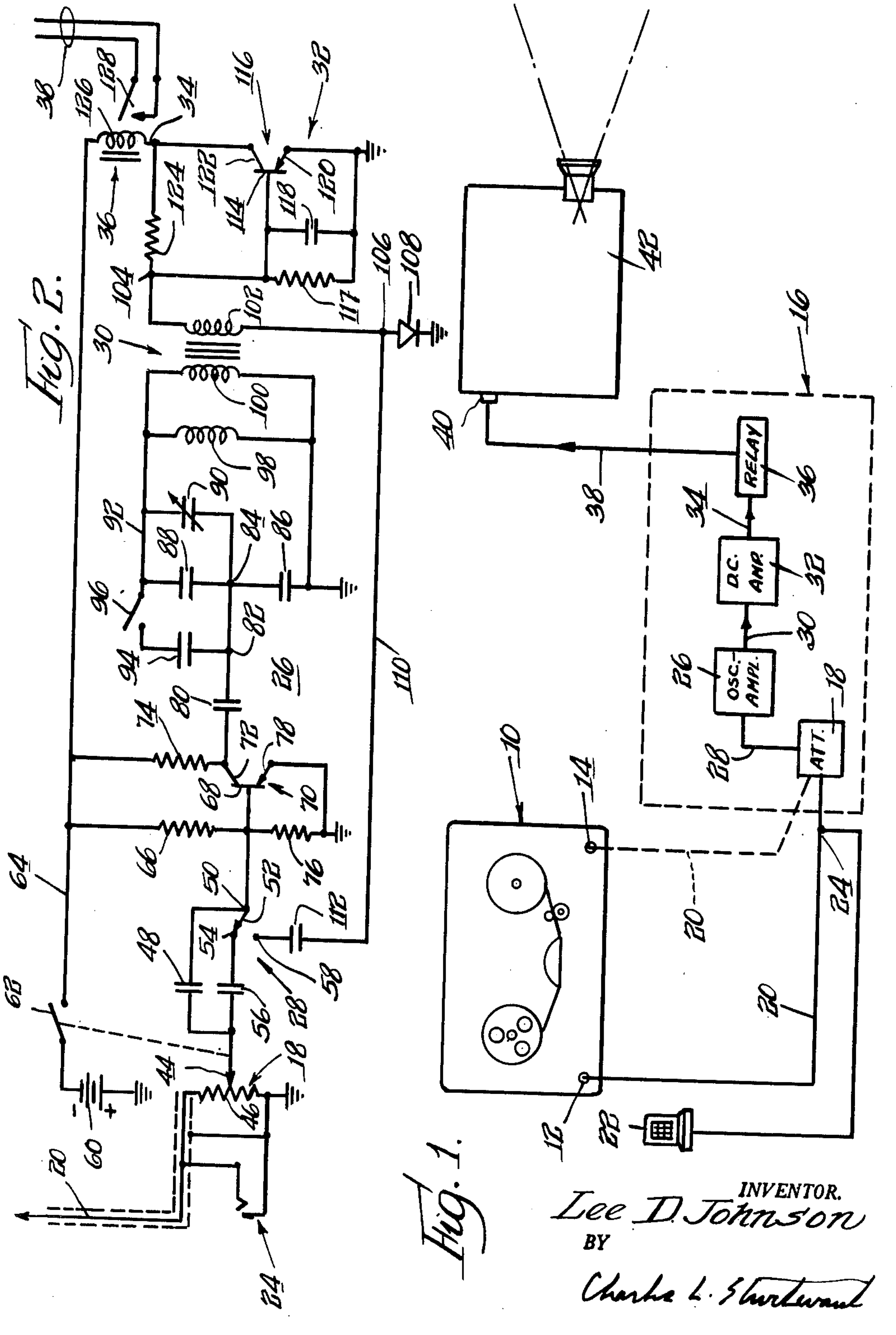
FIG. 1 is a schematic block diagram of the tape recorder-projector-control apparatus set-up.
FIG. 2 is a schematic wiring diagram of the control apparatus.

Referring more in detail to the accompanying drawing, and at this time to FIG. 1, there is shown a tape recorder 10 of any well known type having a low level input connection at 12 and an output connection at 14. The automatic synchronizing device forming the subject matter of this invention is indicated in block form at 16, and an attenuator 18 therein is connected by means of a separable connection, such as the usual plug and jack connection, to a shielded cable 20 leading to the low level input connection 12 of the tape recorder 10. A microphone 22 is connected into the cable 20 at 24, as by means of a plug-in or pin type connector. This arrangement is used for impressing the tone or actuating signal on the tape. When it is desired to use the tape for control purposes, the cable 20 is connected in the dash line position between the output connection 12 and the attenuator 18.

The synchronizing device 16 also includes an oscillator-amplifier 26 connected to the attenuator 18 as at 28. Connection is made from the oscillator-amplifier 26 at 30 to a D.C. amplifier 32, and thence through a connection 34 to the relay 36. The relay is connected, as through a wire 38, to the remote control receptacle 40 of an automatic slide projector 42 of known design.

The details of the invention will be better understood with reference at this time to the schematic wiring diagram of FIG. 2. Thus, the attenuator 18 will be seen to comprise a potentiometer including a tap 44 sliding on the usual resistor 46, the latter being grounded at the lower end. The upper end of the potentiometer resistor 46 is connected directly to the shielded lead of the cable 20, the microphone connection 24 being shown as a jack. The tap 44 is connected through a capacitor 48 to a point 50 connected to a movable switch arm 52. The switch arm is co-operable with a switch contact 54 which is connected through a capacitor 56 to the potentiometer tap 44. The movable switch contact 52 is alternatively engageable with a fixed contact 58 to which reference will be hereinafter made.

The synchronizing device is provided with a replaceable battery 60 having the positive end grounded and having the negative end connected to an on-off switch 62. This switch is conveniently of the type mounted on the back of a potentiometer, and hence is shown as ganged with the sliding tap 44. The fixed contact of the switch 62 is connected to a bus 64, and connection is made from this bus through a resistor 66 to the base 68 of a transistor 70. The collector 72 of this transistor is connected back to the bus 64 through a resistor 74. The base 68 also is connected to the previously-mentioned point 50 and is grounded through a resistor 76. The emitter 78 of the transistor 70 is directly grounded, as shown.

The collector 72 is connected through a capacitor 80 to points 82 and 84. Point 84 is grounded through a capacitor 86, and is connected through a fixed capacitor 88 and a variable capacitor 90 to a line 92. Point 82 is connected through a capacitor 94 and a normally open switch 96 to the line 92. The line 92 is connected to a tuning inductance 98 which is grounded at the opposite end, and also is connected to the input winding 100 of a transformer comprising the connection or coupling 30 previously mentioned. The transistor 70 and the associated circuitry including the capacitors 88, 90 and 94 and the inductance 98 and capacitor 86 comprise the oscillator-amplifier 26, while the switch 52, 54, 58 and associated parts comprise the connection 28.

The output winding 102 of the transformer has the upper end thereof connected to a point 104. The lower end is connected to a point 106 which is grounded through a diode 108, and which is returned through a line 110 and a capacitor 112 to the fixed switch contact 58.

The point 104 is directly connected to the base 114 of a transistor 116. The base is further connected through a resistor 117 and a capacitor 118 in parallel therewith to ground. The emitter 120 of the transistor 116 is grounded directly, while the collector 122 is connected to the connection 34. The connection 34 is further connected through a resistor 124 to the point 104.

The connection 34 is connected through the coil 126 of the relay 36 to the bus 64. The coil, when energized, is arranged to close the relay switch 128, which switch is connected across the two wires of the line 38 connected to the remote control receptacle of the slide projector.

At this point it is important to note that the oscillator-amplifier 26 is capable of operation either as an oscillator or as an amplifier.

When it is desired to record a narrative or the like to be used in controlling an automatic slide projector, the microphone, tape recorder, and synchronizing device are connected as shown in FIG. 1, and switch 62 is closed. Potentiometer or attenuator 18 is adjusted in accordance with the characteristics of the tape recorder. The automatic slide projector 42 may be left unconnected, if so desired, since it does not have anything to do with the placing of a recording on the tape. One simply speaks into the microphone 22 to record on the tape recorder in accordance with the usual procedure. When it is desired to arrange for the changing of a slide at any given point in the narrative, the switch 52 is manually depressed to bring the movable contact into engagement with the fixed contact 58. The oscillator-amplifier then operates as an oscillator, and the oscillating frequency is applied through the capacitor 48 and attenuator 18 to the cable 20, whereby to impress the tone signal on the tape. The tone signal is above the normal maximum frequency of the speech range, but will generally be well within the audio range in order to conform with the capabilities of the tape recorder 10. In fact, the signal of the tone will generally be somewhat different in accordance with the speed of operation of the tape recorder. The frequency is determined by whether or not the switch 96 is closed.

After a tape has been completely recorded with switching tone signals impressed at the desired locations, and it is desired to control the automatic slide projector 42 from the tape, the slide projector is connected to the synchronizing device 16 and the cable 20 is moved from the input connection to the output connection 14. Again, the attenuator 18 is adjusted in accordance with the characteristics of the tape recorder. The switch arm 52 remains in contact with the fixed contact 54, and the oscillator-amplifier 26 operates as a frequency selective amplifier. For tones other than the preselected slide projector operating tone, the tuned circuits of the oscillator-amplifier 26 will not respond. When the preselected tone is provided from the output of the tape recorder (it will be understood that the tape recorder has the usual built-in amplifier and loud-speaker, or is connected to some external amplifier-loud-speaker combination, not shown), the signal is amplified by the transistor 70 and passed by the tuned circuits. It will be understood that the switch 96 must be either open or closed in accordance with its position during recording. The amplified signal is impressed through the transformer 30 on the circuit including the transistor 116, namely the D.C. amplifier (here it will be noted that only D.C. is applied through this circuit due to the diode 108), and when base-collector current is conducted by the transistor, the relay coil 126 causes the relay contacts 128 to close, whereby to operate the automatic slide projector 42 to effect changing from one slide to another.

The tone signal is desirably of rather short duration, and upon its cessation the relay 36 becomes deactivated.

The circuit values of the various components may vary within well known limits. However, by way of example, certain values are hereinafter set forth as follows:

| | | |
|---|---|---|
| Resistor **46** | megohm | 1 |
| Resistor **66** | ohms | 47,000 |
| Resistor **74** | do | 1500 |
| Resistor **76** | do | 2200 |
| Resistor **116** | do | 1000 |
| Resistor **124** | do | 470,000 |
| Capacitor **48** | microfarads | .005 |
| Capacitor **56** | do | 0.5 |
| Capacitor **80** | do | 1.0 |
| Capacitor **86** | do | .02 |
| Capacitor **88** | do | .0015 |
| Capacitor **90** | do | 110–580 |
| Capacitor **94** | do | .005 |
| Capacitor **118** | do | 20 |
| Inductance **98** | millihenries | 150 |
| Battery **60** | volts | 9 |
| Transistor **70** | | 2N205 |
| Transistor **116** | | 2N217 |
| Diode **108** | | 1N34 |

Reference heretofore has been made to the fact that the switching tone signal is of rather brief duration. However, it is of sufficient duration to actuate the timing circuit comprising resistor 117 and capacitor 118. This timing circuit has a sufficiently long time constant to prevent spurious operation in response to voice, music, or other frequencies that might more or less instantaneously happen to coincide with the frequency of the switching tone.

Figures 3, 4:
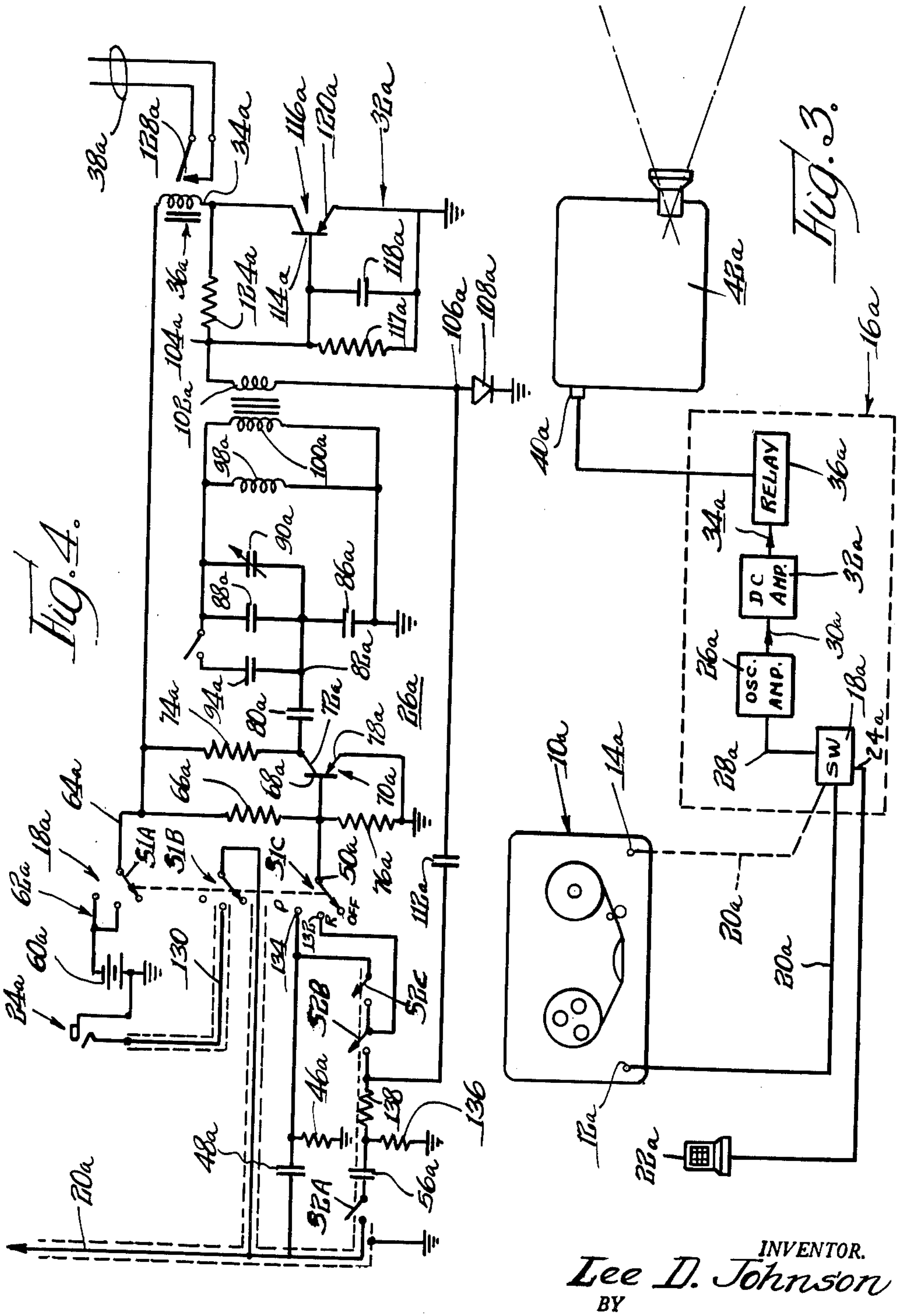
FIG. 3 is a schematic block diagram similar to FIG. 1 and illustrating a modification of the invention.
FIG. 4 is a schematic wiring diagram similar to FIG. 2 and corresponding to FIG. 3.

A modification of the invention is shown in FIGS. 3 and 4 and since most of the parts are similar to those heretofore shown and described, the description of the modification will be limited to the changes involved and for clear understanding, like parts are identified by similar numbers with suffix designation added.

The attenuator is replaced by a function selector switch **18*a* which may conveniently be a three-pole, three-position rotary switch having, as shown in FIG. 4, ganged switch sections S1A, S1B and S1C. The movable arm of the switch section S1A is connected to line 64*a* and in its lower position engages an open contact while in the intermediate and uppermost positions it is connected to the ungrounded side of the battery 60*a*. The movable arm of the switch section S1B is connected to the shielded cable 20*a*. In the lowermost position, this arm engages a grounded contact and in the intermediate position it engages a shielded cable 130 which is connected to the jack 24*a*. In the uppermost or third position, this arm is connected to an open contact. The movable arm of the switch section S1C is connected at all times to point 50*a*. In the lowermost position, this arm engages an open contact; in the intermediate position it engages contact 132 and in the uppermost position it engages contact 134. In connection with this switch section, it is to be noted that contact 132 corresponds to Record and is marked with the letter R and contact 134** corresponds to Playback and is marked with the letter P.

From the above, it will be noted that the switch section S1A connects the battery **60*a* into the circuit on both Record and Playback positions of its movable arm and disconnects the battery in its "off" or lowermost position. The movable arm of the switch section S1B connects the microphone jack 24*a* to cable 20*a* in Record position only and disconnects the jack 24*a* in the lowermost "off" and uppermost Playback positions, to prevent damage to the microphone. In the Record position, the movable arm of the switch section S1C connects the base 68*a* of the transistor 70*a*** to a pushbutton tone switch S2 which may be in the form of a three-pole, single throw, spring return switch. In Playback position, the movable arm of the switch section S1C connects the base 68a of the transistor 70a to the cable 20a through the capacitor 48a.

At this point it will be noted that the resistor 46a is now a fixed resistor with the top thereof connected to contact 134. Capacitor 48a is now positioned to the left of resistor 46a, that is, between this resistor and the shielded cable 20a.

The cable 20a is also connected by means of the pushbutton tone switch S2 to the contact 132. The switch sections S2A, S2B and S2C are normally open ganged sections. The switch section S2A connects the cable 20a through capacitor 56a to a shunting resistor 136 and through a series resistor 138 to the second switch section S2B. The junction of the resistor 138 and switch section S2B is connected to the capacitor 112a. The switch section S2B is connected to the contact 132 and the switch section S2C is connected to the contact 134.

From the foregoing, it will be noted that the switch section S2A connects the attenuated oscillator output to cable 20a in order to impress a tone on the tape. The switch S2B connects the capacitor 112a to the base 68a of the transistor 70a when the function switch 18a is in Record position, that is, with the movable arm of switch section S1C in its intermediate position engaging the contact 132. The switch section S2C connects the capacitor 112a to the base 68a of the transistor 70a when the function switch 18a is in Playback position, that is, with the movable arm of the switch section S1C in uppermost position engaging the contact 134. This permits a slide to be advanced during Playback by pressing the tone button to accomplish synchronization, if necessary.

The above-described modification somewhat simplifies the operation and reliability of the device. The variable attenuator has been removed and optimum signal levels may be preset for both Record and Playback operation with all types of tape recorders. The microphone is automatically disconnected in Playback position to prevent damage to the microphone. Although the operator can disconnect the microphone during Playback, the switch section S1B of the function selector switch 18a automatically disconnects the microphone during Playback with its movable arm engaging the uppermost open contact.

Some of the circuit values have been changed or added, and representative values are as follows:

| | | |
|---|---|---|
| Resistor 46a | [1] megohm | 1.0 |
| Resistor 136 | ohms | 560,000 |
| Resistor 138 | megohm | 1.0 |
| Capacitor 48a | microfarad | 1.0 |
| Capacitor 56a | do | .001 |

[1] Fixed.

Thus, the fixed load resistor 46a is associated with the capacitor 48a to provide the correct average signal level to transistor 70a. The capacitor 56a, resistor 138 and resistor 136 make up a network to feed the correct amplitude of oscillator output signal to the input of the tape recorder in Record position through cable 20a.

Briefly, it will now be apparent that for recording, the switch sections S1A, S1B and S1C are moved to the intermediate positions and the pushbutton switch sections S2A, S2B and S2C are closed. For Playback, the switch sections S2A, S2B and S2C are allowed to remain open and the switch sections S1A, S1B and S1C are moved to the uppermost position.

It will be apparent that two embodiments of a simple synchronizing device has herein been described and one which is operable to impress a tone signal on a tape recorder and thereafter to respond to this tone signal on the tape record automatically to actuate a slide projector. This is done without mutilation of the tape so that the tape can be subsequently erased and reused. An economy of parts, and hence light weight and long battery life is effected by using a common circuit alternatively as an oscillator or as a frequency selective amplifier. This synchronizing device can serve as an accessory to substantially any make or model of tape recorder and where designed for home use, it will be possible for anyone having both a tape recorder and an electrically controlled slide projector to synchronize a tape recorded lecture or any program on a series of slides completely automatically. Each slide will automatically change at a predetermined point and the performance will be exactly the same each time it is presented so that the operator need do nothing more than turn the equipment on and off. While described in connection with a slide projector, the device will have application to audio-visual advertising and training lectures illustrated by slides or film strips and in other environments to stop, start or otherwise control automatically other electrically operated mechanism in conjunction with a tape recorder.

While two forms of the invention have been shown for purposes of illustration, it is to be clearly understood that various changes in the details of construction and/or arrangement of parts may be made without departing from the spirit and scope of the invention as set forth in the appended claims.

I claim:

1. Remote control apparatus for use in conjunction with a recording apparatus of the type including recording and reproducing means and associated amplifying means, and an appurtenant controlled device having provision for remote control in response to a predetermined controlling signal; and comprising input and output means, means for providing a controlling signal for remote operation of said device, electronic means interconnecting said input and output means and said controlling signal providing means and including an electronic valve connected in circuit with tuned circuit means having inductance and capacitance means therein, said input means being connected to said tuned circuit electronic valve means free of any intervening electronic valve means, means connecting said tuned circuit means to said output means and including electronic valve means operative as an electronic switch and inductance means coupling said tuned circuit means to said last mentioned electronic valve means, said last mentioned connecting means being substantially devoid of amplification, and feedback means including switch means interconnected with said electronic valve means and said last mentioned inductance means, said switch means effective alternatively to render said electronic means an oscillator and a tuned amplifier.

2. Remote control apparatus as claimed in claim 1, wherein said feedback means is shunted to ground by a diode.

3. Remote control apparatus as claimed in claim 1; and further including voltage divider means in said electronic means and interconnected with said switch means, said voltage divider means having impedance means connected to said input and output means and further having means engageable by a movable member, and a movable member engageable therewith and connected to said electronic valve.

References Cited by the Examiner

UNITED STATES PATENTS

| | | | |
|---|---|---|---|
| 2,567,499 | 9/51 | Vaughn | 88—28 |
| 2,811,588 | 10/57 | Julie | 179—100.1 |
| 2,975,672 | 3/61 | Shields | 88—28 |

IRVING L. SRAGOW, *Primary Examiner.*

EMIL G. ANDERSON, BERNARD KONICK, *Examiners.*